United States Patent
Phan

(10) Patent No.: US 9,088,347 B2
(45) Date of Patent: Jul. 21, 2015

(54) METHOD AND DEVICE FOR RECOGNIZING A COMMUNICATING MOBILE TERMINAL

(71) Applicant: MOBI RIDER, Labege (FR)

(72) Inventor: Nghia Phan, Verfeil (FR)

(73) Assignee: MOBI RIDER, Labege (FR)

( * ) Notice: Subject to any disclaimer, the term of this patent is extended or adjusted under 35 U.S.C. 154(b) by 0 days.

(21) Appl. No.: 14/379,506

(22) PCT Filed: Feb. 28, 2013

(86) PCT No.: PCT/FR2013/050432
§ 371 (c)(1),
(2) Date: Aug. 19, 2014

(87) PCT Pub. No.: WO2013/128139
PCT Pub. Date: Sep. 6, 2013

(65) Prior Publication Data
US 2015/0055687 A1    Feb. 26, 2015

(30) Foreign Application Priority Data

Feb. 29, 2012   (FR) ..................... 12 51850
May 10, 2012   (FR) ..................... 12 54285

(51) Int. Cl.
*H04B 1/00*      (2006.01)
*H04B 1/707*    (2011.01)
*H04L 29/06*    (2006.01)
*H04W 12/06*   (2009.01)
(Continued)

(52) U.S. Cl.
CPC ............ *H04B 1/707* (2013.01); *G06Q 30/0207* (2013.01); *G06Q 30/0241* (2013.01); *G06Q 30/0267* (2013.01); *G06Q 30/0281* (2013.01); *H04L 63/0815* (2013.01); *H04W 4/12* (2013.01); *H04W 12/06* (2013.01)

(58) Field of Classification Search
CPC ........ H04B 1/707; H04W 4/12; H04W 12/06; G06Q 30/0281; G06Q 30/0241; G06Q 30/0207; G06Q 30/0267; H04L 63/0815
See application file for complete search history.

(56) References Cited

U.S. PATENT DOCUMENTS 7,706,784 B2    4/2010   Weiner et al.
8,283,991 B1*   10/2012  Essenwanger ................. 333/26
2006/0208066 A1* 9/2006  Finn et al. ..................... 235/380

(Continued)

FOREIGN PATENT DOCUMENTS

EP    1995985 A1   11/2008
GB    2472832 A    2/2011

(Continued)

*Primary Examiner* — Erin File
(74) *Attorney, Agent, or Firm* — Im IP Law PLLC; C. Andrew Im

(57) ABSTRACT

Apparatus for identifying a communicating mobile terminal comprises an electromagnetic coupling device, an ultra-wide-band radio subsystem and a monitoring subsystem. The electromagnetic coupling device defines an exclusive zone for electromagnetic coupling between the device and the communicating mobile terminal, The ultra-wide-band radiofrequency subsystem simulates the availability to communicate with the mobile terminal of at least one base station of a telecommunication network. The monitoring subsystem recognizes a unique digital signature of the communicating mobile terminal implementing samples of an electromagnetic trace of a message sent by the mobile terminal in attempt to connect to a simulated base station.

20 Claims, 12 Drawing Sheets

(51) Int. Cl.
*G06Q 30/02* (2012.01)
*H04W 4/12* (2009.01)

(56) References Cited

U.S. PATENT DOCUMENTS

2008/0220777 A1   9/2008   Kouadjo et al.
2009/0289776 A1*  11/2009  Moore et al. ............... 340/10.41
2010/0273504 A1   10/2010  Bull et al.
2013/0162366 A1*  6/2013   Essenwanger .................. 333/26

FOREIGN PATENT DOCUMENTS

WO   2006/122364 A1   11/2006
WO   2007/010223 A1   1/2007

* cited by examiner

METHOD AND DEVICE FOR RECOGNIZING A COMMUNICATING MOBILE TERMINAL

RELATED APPLICATIONS

This application is a §371 application from PCT/FR2013/050432 filed Feb. 28, 2013, which claims priority from French Patent Application No. 12 51850 filed Feb. 29, 2012 and French Patent Application No. 12 54285 filed May 10, 2012, each of which is herein incorporated by reference in its entirety.

TECHNICAL FIELD OF THE INVENTION

The present invention relates to a method and a device for recognizing a communicating mobile terminal. It applies, in particular, to the identification of a terminal in order to deliver a personalized item of information to a user of this terminal.

PRIOR ART

Identification, a process which consists in communicating or recognizing an identity, must be fast, universal but also respectful of the individual's privacy. This identification can be used in particular to allow or prohibit access to a service or of a product.

For example, at a place of sale, the identification of a customer allows the trader to differentiate and to rate each customer in a personalized manner.

For a few years, so-called "contactless" technologies of RFID type (acronym standing for RadioFrequency IDentification) or NFC type (acronym standing for Near Field Communication) have allowed fast identification. However, these technologies require the deployment, at one and the same time, of new readers in places desiring identification and of new plastic cards equipped with passive RFID tags ("labels"), weighing a little more heavily on users' pockets or wallets, or else the mass deployment of expensive but still rather scarce new NFC mobile terminals.

On account of the necessary connection to the operator's server, identification is complex, slow, costly and limited to the geographical zones where the signal emitted by the operator is available.

Certain solutions which are alternatives to RFID and NFC have been the subject of patent filings. A patent has been granted in the United States to Avish Jacob Weiner and Dror Fixler under the number U.S. Pat. No. 7,706,784 dated Apr. 27, 2010. In this patent, it is proposed to use a cellular telephone protocol to obtain an identifier temporarily assigned to a mobile in a zone determined by the mobile telephone operator at this mobile. This identifier being temporarily defined by the mobile telephone operator of the mobile in question, it is proposed to establish a communication between the system and the servers of the mobile telephone operator in question so as to obtain secure and unique identification of the mobile to which the operator has assigned this temporary identifier, for security reasons. The patent refers in particular to the use, for identification purposes, of confidential and personal information such as the IMSI number, retained by the personal SIM card (acronym standing for "Subscriber Identification Module") of the bearer of the mobile telephone.

On account of the necessity of establishing a communication sufficient to receive the confidential information and then of interrogating a server, this type of identification device is very slow. It is therefore not suitable for fast identification, for example in a shop or for issuing tickets or opening a barrier or door.

OBJECT OF THE INVENTION

The present invention is aimed at remedying all or some of these drawbacks.

For this purpose, the present invention is aimed at a device for recognizing a communicating mobile terminal, which comprises:
- an electromagnetic coupling means defining an exclusive zone of electromagnetic coupling between the device and the communicating mobile terminal,
- an ultra-wide-band radio interfacing means simulating the availability to communicate with the mobile terminal of at least one base station of a telecommunication network and
- a means for recognizing a unique digital signature of the communicating mobile terminal implementing samples of an electromagnetic trace of a message dispatched by the mobile terminal so as to attempt to connect to a simulated base station.

By virtue of these arrangements, without a connection being established between a base station and the communicating mobile terminal, the communicating mobile terminal is caused to effect the emission of a message representative of at least one of its identifiers, and samples of an electromagnetic trace of the message emitted are picked up, without decoding this message. These samples make it possible to construct a unique signature of the communicating mobile terminal, without knowing any of its identifiers.

In embodiments, the interfacing means simulates the availability of a base station of a cellular telecommunication network.

In embodiments, the device comprises, furthermore, a means for transmitting mini-messages to said communicating mobile terminal without using the telephone number of the communicating mobile terminal.

By virtue of these arrangements, the device allows the storage of information in the terminal and/or the launching of an application downloaded in this terminal.

In embodiments, the largest dimension of the exclusive electromagnetic coupling zone is less than half the wavelength of the electromagnetic signals implemented by the radio interfacing means.

By virtue of these arrangements, the waves do not form inside the coupling zone.

In embodiments, the device comprises, furthermore:
- a means for receiving a reference clock signal from a cellular telephone network and
- a means for emitting an electromagnetic signal inside the exclusive electromagnetic coupling zone, said signal being synchronized with said reference clock received.

By virtue of these arrangements, the terminal does not have to re-synchronize itself and can therefore dispatch its message with a view to connecting to the simulated base station more rapidly.

In embodiments, the means for receiving a reference clock comprises an antenna outside the electromagnetic coupling zone, said antenna receiving a clock signal from a base station of the cellular telephone network.

In embodiments, the interfacing means is configured to simultaneously emit signals having carriers simulating a plurality of base stations.

In embodiments, the device comprises, furthermore:
- a means for allocating a communication channel to the mobile terminal,
- a means for receiving, on the allocated channel, a message representative of a positioning update request ("location update") in respect of the mobile terminal, said request being representative of at least one identifier of the mobile terminal and a means for extracting samples of the positioning update request signal, so as to define a signature of the mobile terminal.

By virtue of these arrangements, the message used to generate the signature is a message dispatched rapidly by the communicating mobile terminal.

In embodiments, the means for allocating a communication channel is configured to accept a communication channel request originating from the mobile terminal.

By virtue of these arrangements, tuning to the communication channel is very rapidly obtained by the mobile terminal.

In embodiments, said communication channel is a point-to-point communication channel.

By virtue of these arrangements, although the device has not decoded any message received on the part of the communicating mobile terminal, it sets up with this terminal a bidirectional communication.

In embodiments, the device comprises a means for emitting a message on said communication channel, so as to cause an item of information to be stored in the mobile terminal.

In embodiments, said item of information stored in the mobile terminal depends on the identifier of the mobile terminal.

Thus, a personalized item of information, for example a promotion, is dispatched to the user of the communicating mobile terminal.

In embodiments, in the message emitted by the means for emitting a message on said channel comprises an instruction to launch an application loaded on the mobile terminal.

The user can thus, by retrieving the mobile terminal, immediately view a personalized item of information or an application interface affording him immediate access thereto.

In embodiments, the means for emitting a message on said communication channel is configured so that said message takes the form of a short message ("SMS").

In embodiments, the means for extracting samples is configured to extract samples representative of the positioning update request, at predetermined instants at which said positioning update request represents an identifier of the mobile terminal.

In embodiments, the device comprises:
a means for allocating a communication channel to the mobile terminal and
a means for emitting a message on said channel without decoding any positioning update message emitted by the mobile terminal.

By virtue of each of these arrangements, the terminal obtains a personalized item of information, without the device having knowledge of an identifier of this terminal.

According to a second aspect, the present invention is aimed at a method for identifying a communicating mobile terminal, which comprises:
a step of electromagnetic coupling in an exclusive zone of electromagnetic coupling between the device and the communicating mobile terminal,
a step of ultra-wide-band radio interfacing simulating the availability to communicate with the mobile terminal of at least one base station of a telecommunication network and
a step of recognizing a unique digital signature of the communicating mobile terminal implementing samples of an electromagnetic trace of a message dispatched by the mobile terminal so as to attempt to connect to a simulated base station.

The advantages, aims and particular characteristics of this method being similar to those of the device which is the subject of the present invention, they are not recalled here.

BRIEF DESCRIPTION OF THE FIGURES

Other advantages, aims and particular characteristics of the invention will emerge from the nonlimiting description which follows of at least one particular embodiment of the device for capturing a physical quantity, with regard to the appended drawings, in which.

DESCRIPTION OF EXEMPLARY EMBODIMENTS OF THE INVENTION

It is noted that the figures are not to scale.

In the embodiments described hereinbelow, the device which is the subject of the present invention is particularly suitable for fast recognition of a mobile telephone, with a neat device, for example so as to deliver personalized information to the user of this telephone. For example, this embodiment allows the implementation of a virtual loyalty card, the information provided to the user representing offers or reductions.

Figure 1:
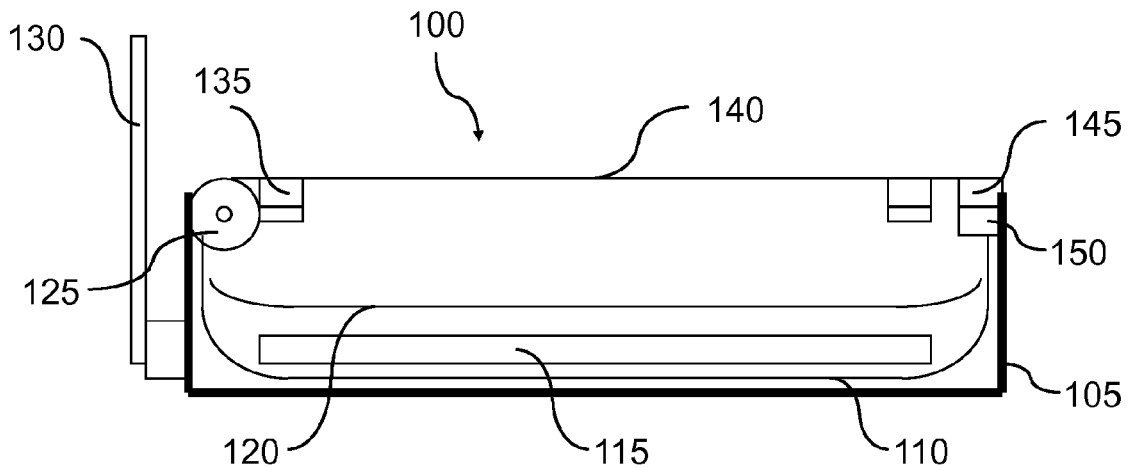
FIG. 1 represents, schematically and in section, a particular embodiment of the device for recognition of a communicating mobile terminal which is the subject of the present invention, in the closed position.
Figure 2:
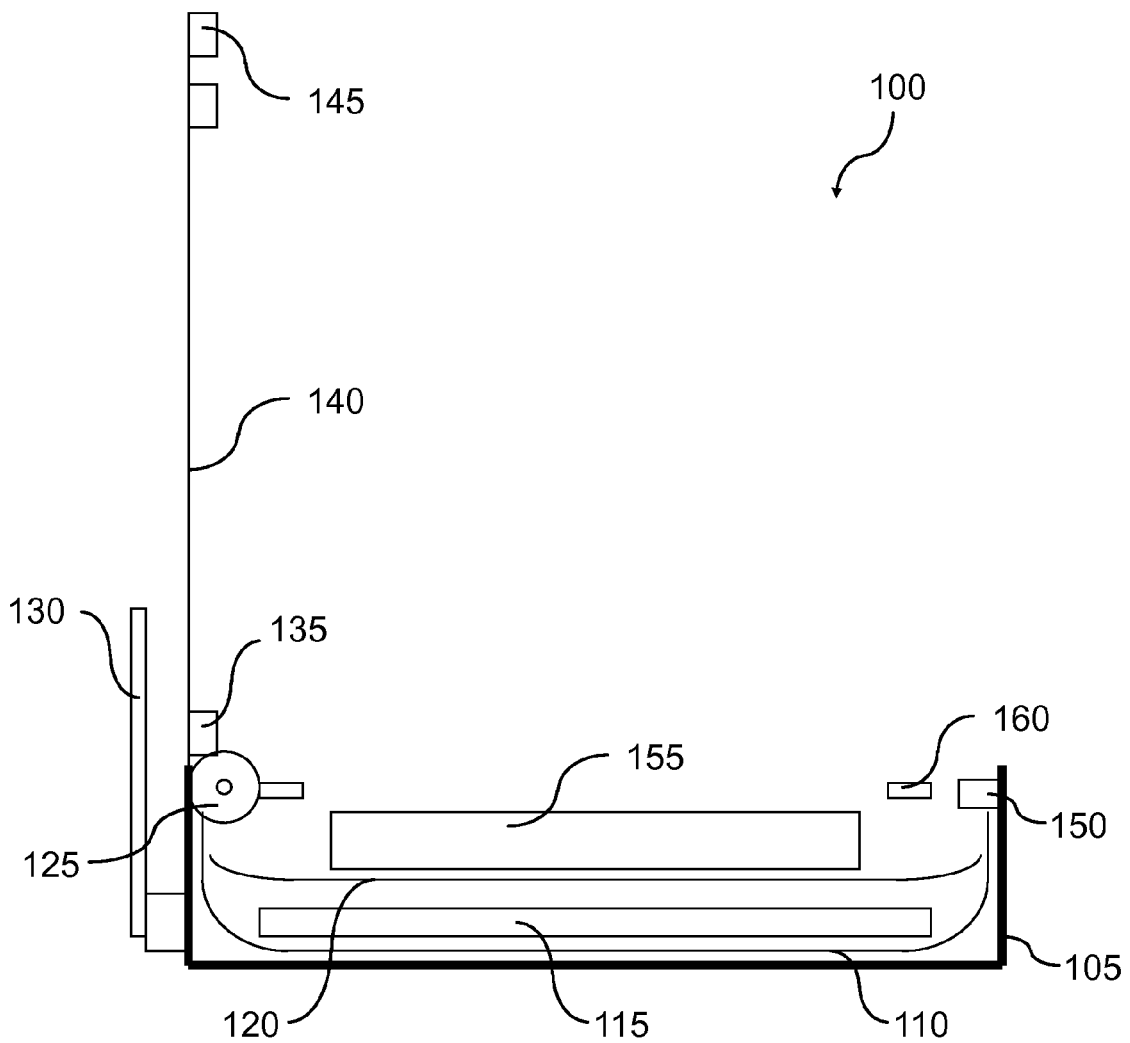
FIG. 2 represents, schematically and in section, the device illustrated in FIG. 1, in the open position.

In FIGS. 1 and 2 is observed a device 100 for recognizing communicating mobile terminals, such as the mobile telephone 155 (FIG. 2). This device 100 comprises:
a rigid box 105,
a lower electrically conducting shell 110, inside the box 105,
an electronic circuit 115, above the shell 110,
an electrically non-conducting upper cover 120, for example of plastic, above the electronic circuit 115,
an exterior antenna 130,
a rotation shaft 125 linked to the box 105, on the one hand, and to a flap 140, on the other hand,
the electrically conducting and preferably at least partially transparent flap 140 carrying a peripheral conducting seal 135 and a ferromagnetic metallic piece 145, facing the peripheral conducting seal 135, a conducting rim 160 secured to the box 105 and facing the ferromagnetic metallic piece 145, an electromagnet 150 forming a lock to keep the flap 140 closed or to release it.

The rigid box 105 is made of any substance whatsoever and takes any form, for example one of the forms illustrated in FIGS. 6 to 11. The lower conducting shell 110 forms with the conducting flap 140, the conducting seal 135 and the conducting rim 160 a Faraday cage. As set forth further on, the antenna 130 makes it possible, despite this Faraday cage, to maintain the synchronization of the mobile telephone 155 with a base station antenna of a cellular telephone network.

The conducting rim 160 is, for example, a metallic seal bearing on foam or fabric.

Figure 5:
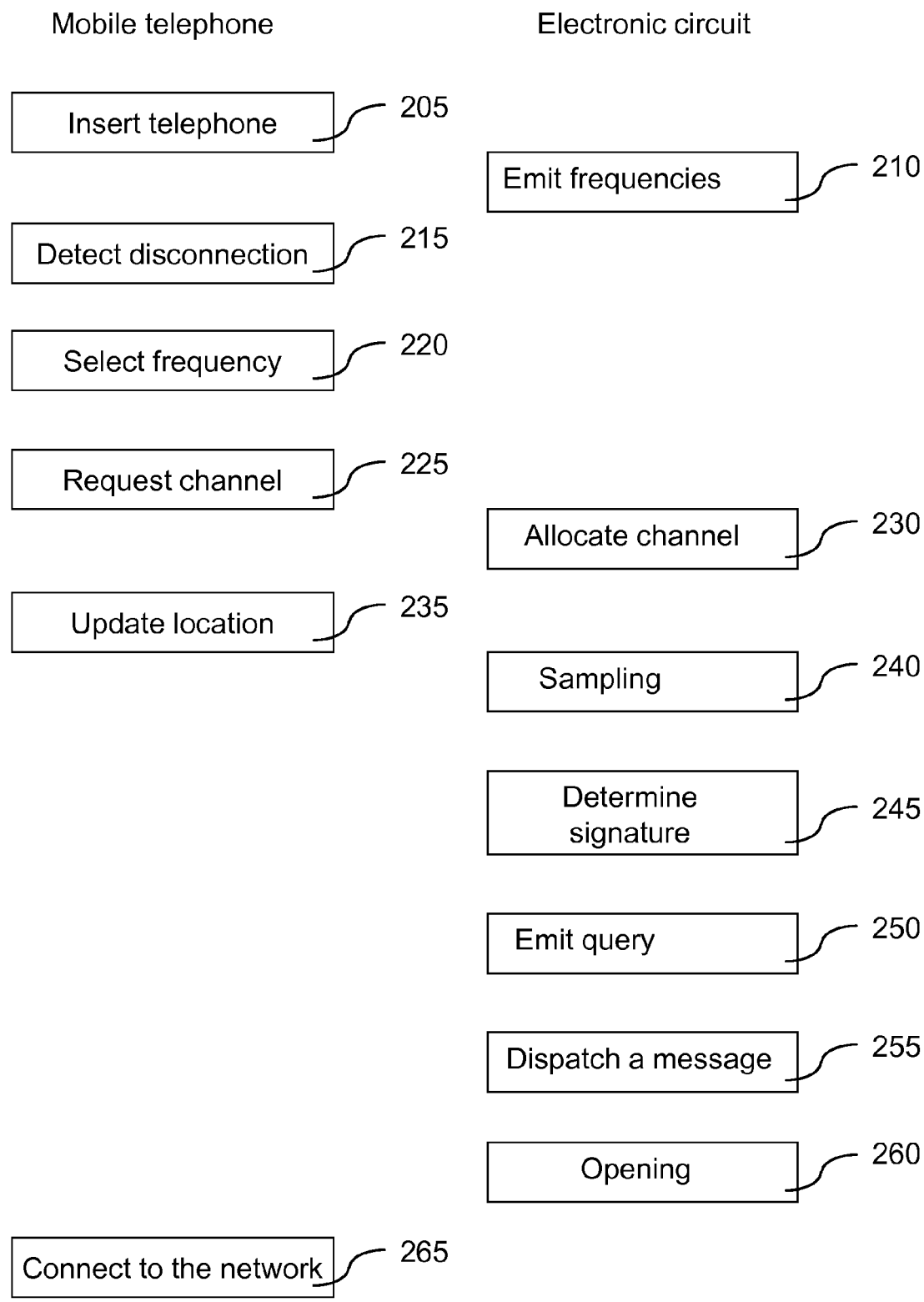
FIG. 5 represents, in the form of a logic diagram, steps of a particular embodiment of the method which is the subject of the present invention.
Figure 13:
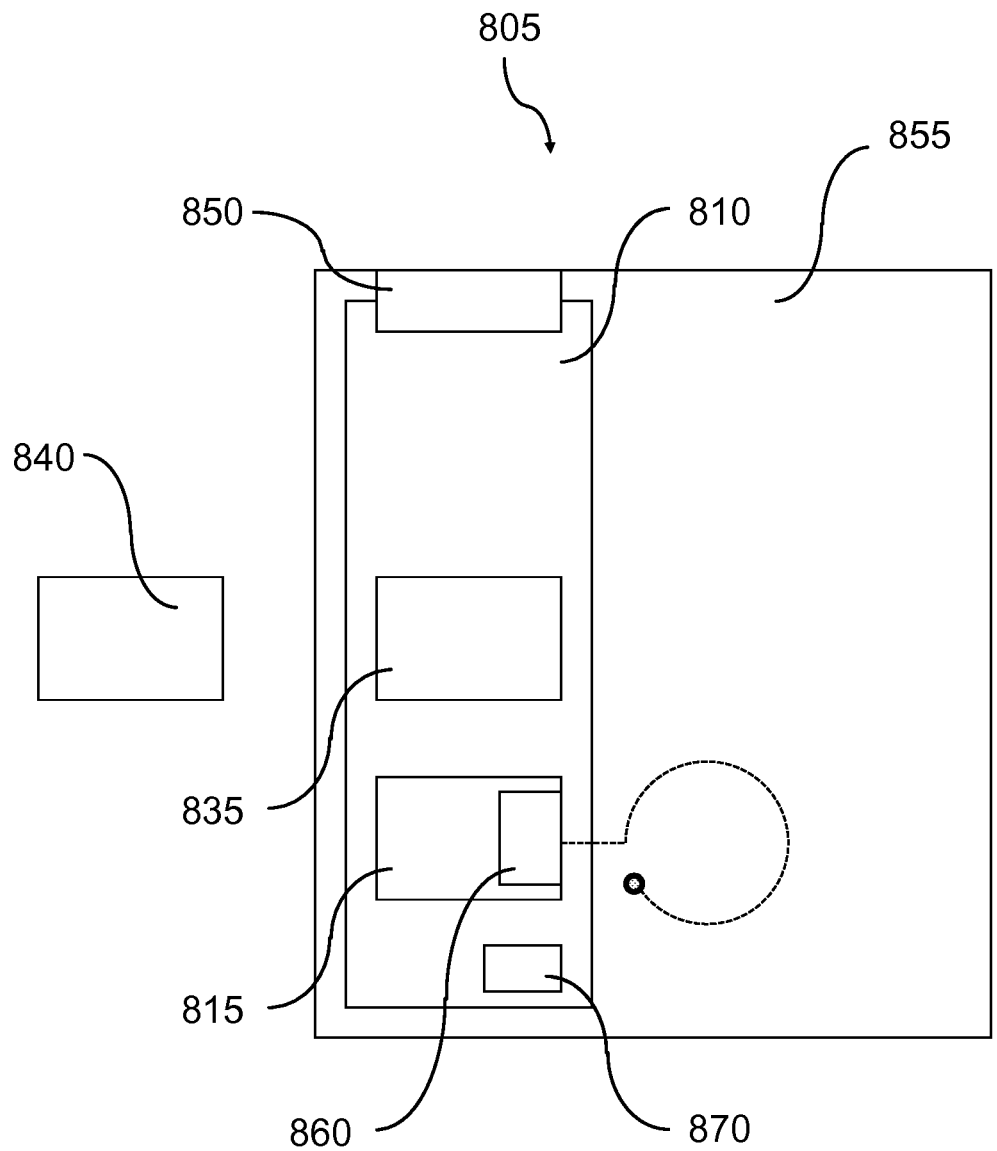
Figure 14:
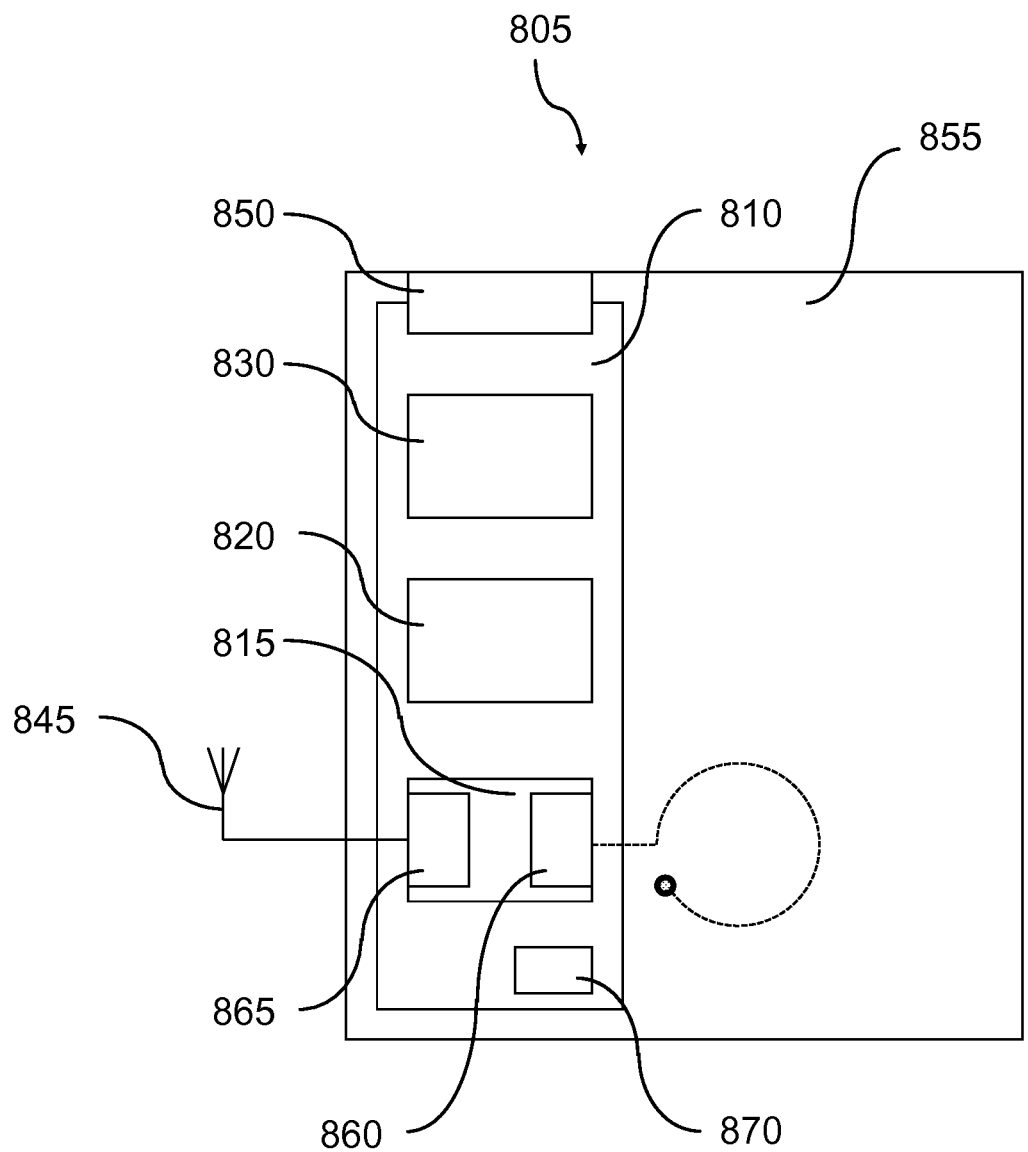
Figure 15A:
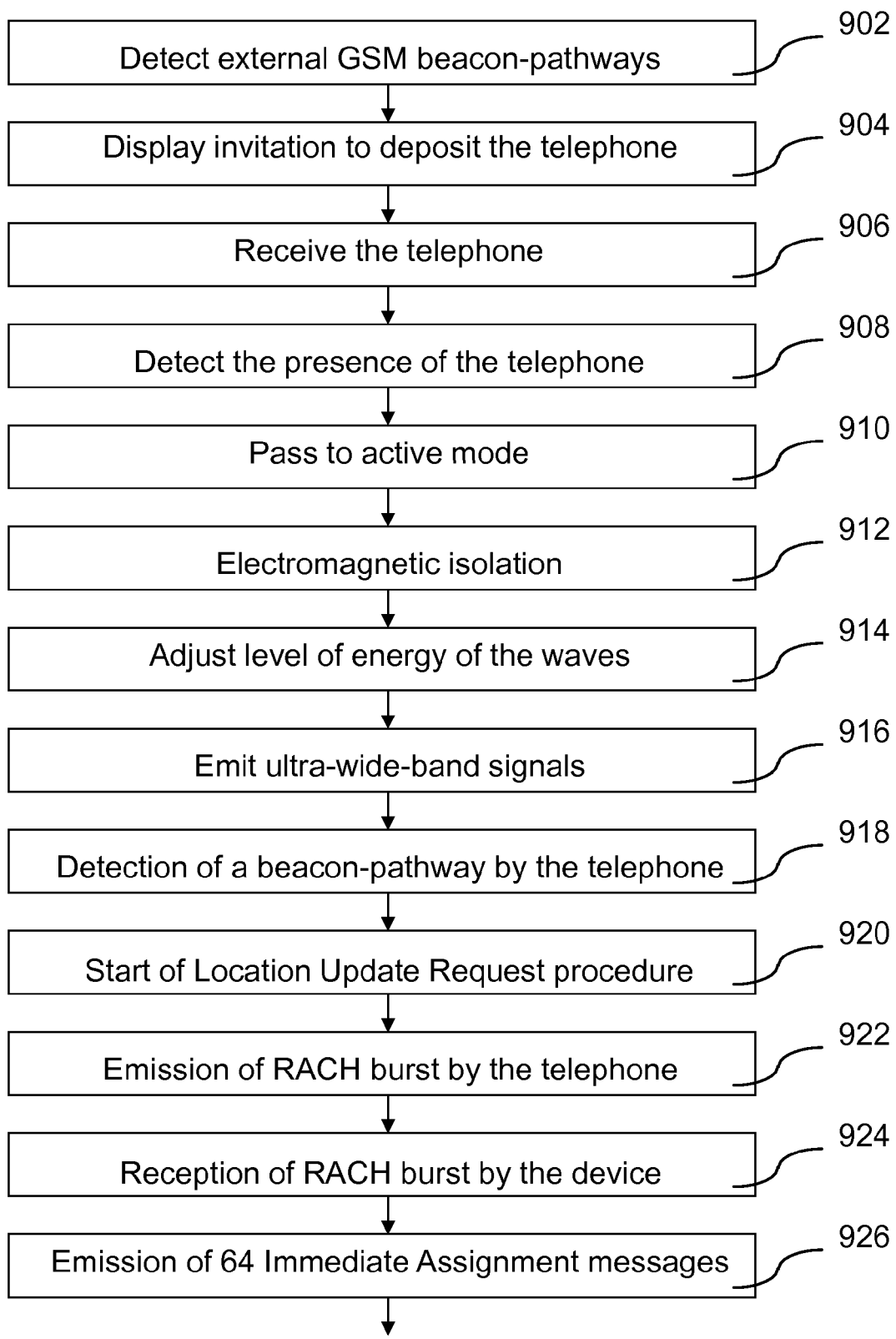
FIGS. 15A and 15B represent, in the form of a logic diagram, steps implemented in a particular embodiment of the method which is the subject of the invention
Figure 15B:
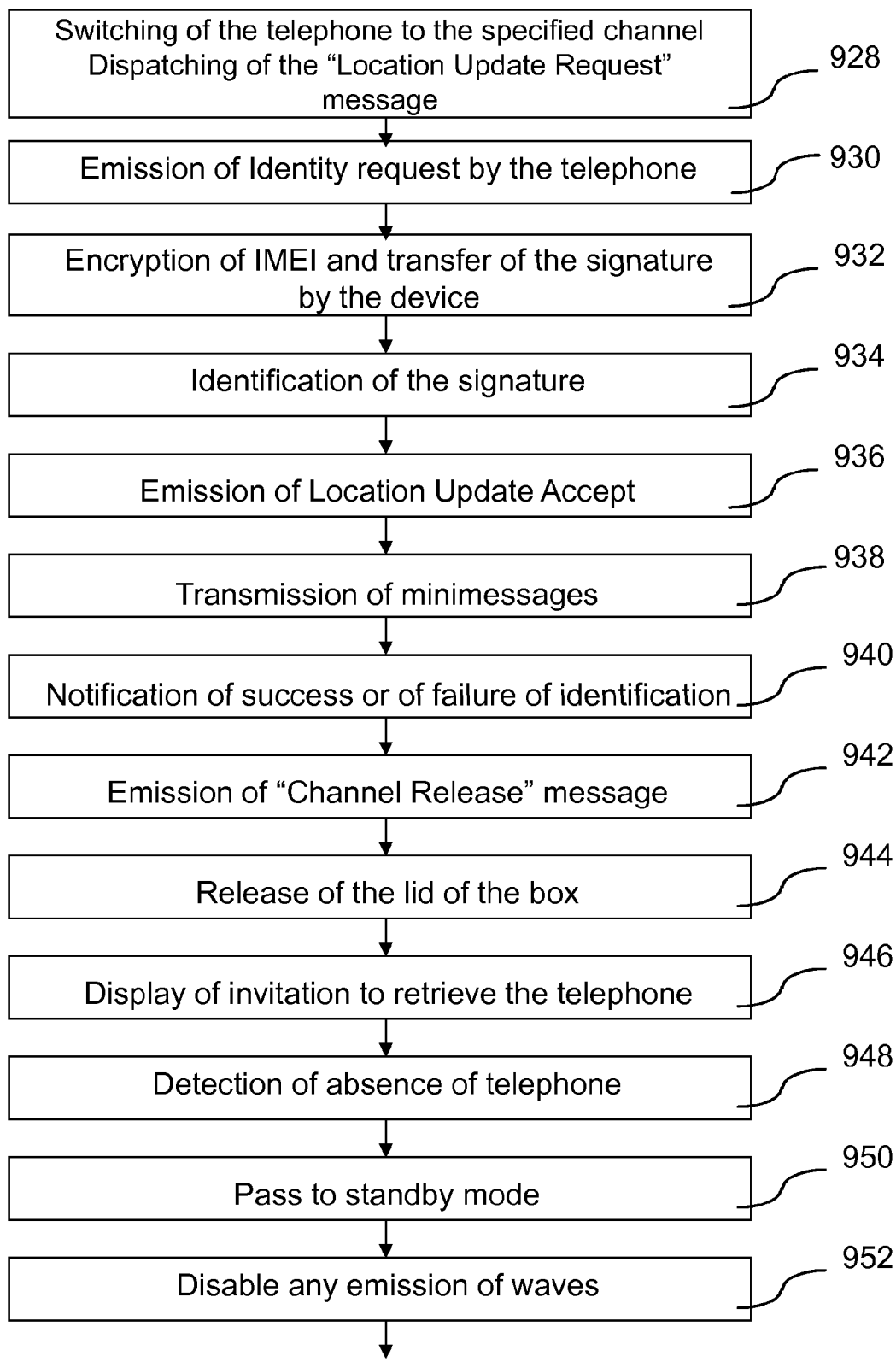

The electronic circuit 115 is illustrated in conjunction with FIGS. 5 and 15, as regards its functions and in conjunction with FIGS. 3, 4 and 12 to 14, as regards its components.

The function of the upper cover 120 is to mask in regard to the user the electronic circuit 115 and to support the mobile telephone 155.

The exterior antenna 130 provides a time base for the synchronization of the circuit 115 and of the mobile telephone 155.

The rotation shaft 125 comprises, preferably, a restoring spring for opening the flap 140 when the electro-magnet 150 is not energized.

The flap 140 consists, for example, of a glass plate, on top, of an intercalary peripheral metal foil and of a conducting film over the whole of the surface, glued to the glass plate, underneath. This film is, for example, metallized by nanotechnologies. The peripheral conducting seal 135 is glued onto the peripheral metal foil.

Preferably, a breaker with external access (not represented) makes it possible to cut off the power supply to the electro-magnet 150, so as to open the flap 140 in case of fault of the device keeping this electro-magnet 150 energized.

Inside the box is effected an electromagnetic coupling between an emitter-receiver component 180 (FIG. 3) and the antenna of the mobile telephone 155. It is noted that the largest internal dimension of the conducting shell 110 is preferably between a quarter and a half of the wavelength used by the mobile telephone 155. Thus, it is merely an electromagnetic coupling field which forms between the emitter-receiver component 180 and the antenna of the mobile telephone 155, since no wave can form in the interior space of the Faraday cage. Thus, the electromagnetic coupling is similar to that which exists between two coils, or inductors. In order for the coupling to be effective, the component 180 is configured to effect a coupling according to the horizontal polarization.

The dimension of the Faraday cage is related to the comb of frequencies emitted (see further on).

It is observed that, preferably, the emitter-receiver component 180 emits electromagnetic waves only when the flap 140 is closed. This ensures the absence of electromagnetic emissions which could disturb other mobile telephones outside the box 105.

The antenna 130 makes it possible to control the discontinuity of the electromagnetic field surrounding the mobile telephone 155 during the closing of the Faraday cage, that is to say of the flap 140 so as to avoid losing the synchronization of the mobile telephone with the mobile telephone network, while causing, on its part, an attempted identification on a mobile telephone network.

Rather than eliminate the electromagnetic field, the characteristics thereof are merely modified so as to enter into interaction with the mobile telephone 155 more rapidly.

Thus, preferably, loss of synchronization of the mobile telephone 155 is avoided but a change of cell of a cellular telephone network is simulated, as if the new cell had the same synchronization signal as the cell which is exited.

Thus, inside the Faraday cage, use is made of the clock reference provided by the base station exterior to the device 100. A stable clock is thus obtained at lesser expense, a simple quartz synchronized with the clock signal of this base station and picked up by the antenna 130, sufficient for the generation of this clock inside the Faraday cage. It is noted that the external clock signal is preferably not used when an electromagnetic field is emitted inside the Faraday cage by the circuit 115. According to the drift ("shift"), the quartz is re-synchronized, at various moments, with the external base station.

It is noted that this maintaining of the synchronization is favorable both for the recognition of the mobile telephone and for the restoring of the initial cell when the flap 140 is opened and the mobile telephone 155 has to resume its communication with the cellular telephone network external to the device 100.

Thus, inside the Faraday cage, the signals of other cells are emitted while duplicating partially, that is to say at the level of the synchronization, the electromagnetic environment present outside the device 100.

Thus, from the point of view of the mobile telephone 155, one changes "area code" (region code) as if the mobile telephone 155 had changed region or country. The frequency and the synchronization (phase) remaining unchanged, only a software parameter is modified.

To increase the speed of recognition of the mobile telephone, inside the Faraday cage, use is made of a set (or comb) of frequencies 185 (see FIG. 4) which covers a wide interval of frequencies. A multitude, or indeed the entirety, of base stations of cells of a cellular telephone network is thus simulated. This allows the mobile telephone 155 to immediately find a base station with which to communicate without successively testing various base station frequencies.

The mobile telephone 155 thus dispatches a positioning update request of which of the samples, representative of at least one of its identifiers, serves as signature for the recognition of the mobile telephone 155.

It is noted that, by proceeding in this way, the device 100 does not perform any connection with the network of the operator to which the mobile telephone 155 is attached and needs no analysis of the environment outside the box 105.

Preferably, the frequency comb, which represents an ultra-wide band ("UWB") comprises several hundreds of base station frequencies, for example five hundred. The energy emitted is spread, thereby avoiding the saturation and the search for a base station frequency beyond the first frequency tested by the mobile telephone 155. The mobile telephone 155 is thus immediately latched in frequency and in phase with the simulated base station.

Everything happens, from the point of view of the mobile telephone 155, as if it exited one cell (that to which the mobile telephone 155 was linked outside the box 105) and found another having the same synchronization (phase) and the same frequency.

Thus, the device 100 uses the physical layer of the mobile telephone network but not in any way the higher protocol layers, in particular those implementing a decoding.

On the physical layer, the signature consists of samples representative of at least one identifier of the mobile telephone 155, for example its IMEI. It is noted that the signature may arise from samples of the electromagnetic trace of various messages, according to the communication protocol used by the mobile terminal 155, provided that the message considered represents an identifier of the terminal or of an additional identification card of the user, for example an SIM card.

On the other hand, to communicate from the device 100 to the mobile telephone 155, it is possible to dispatch a short message (SMS for short message system) or a USSD ("Unstructured Supplementary Service Data").

Thus, although no upgoing message (from the mobile telephone 155 to the simulated base station) is decoded, it is possible to encode a downgoing message since the moment at which to emit this coded message is known.

The digital signature of the mobile telephone 155 consists of samples of the enrollment phase representing at least one identifier. Preferably, a digest ("hash", for example SHA1 or SHA2) is formed on the basis of these samples to give a signature which is retained on a server of signatures that are associated with mobile telephones of referenced users (for example bearers of a loyalty card or of a right of access).

It is noted that the samples of the enrollment signal which serve to constitute the signature of the mobile telephone 155 comprise samples representative of the IMEI or of the IMSI, these two identifiers being represented successively in the enrollment signal emitted by the mobile telephone 155, in the GSM standard. The other mobile telephone standards exhibit similar signals representative, likewise, of at least one unique identifier of the identifier of the SIM card of the mobile telephone.

The device 100 is preferably linked to the Internet network, for example through a decoder box or the mobile telephone network, directly, or by way of a tablet or an external cash till. In embodiments, the database is retained locally. Such is, for example, the case when the device 100 which is the subject of the present invention serves to give an access, for example by opening of a door or barrier, for example in a hotel establishment.

It is noted that, from the point of view of a shop cash till, the signature may be seen as a string of characters, such as those provided by a barcode reader. If the connection between the device 100 is a USB connector, this device is seen as a simple peripheral with which is associated a small library of programs.

Preferably, through the downgoing communication, the device 100 launches an application on the mobile telephone 155, in particular when this mobile telephone 155 is a smartphone. For example, when the device 100 allows the implementation of virtual loyalty cards, the application launched is an application representing the various aspects of the loyalty card.

In the case of the creation of the loyalty card, the same procedure is implemented to create a unique digital signature of the mobile telephone 155 and to associate it with data representative of its bearer (name, mobile telephone number and address, for example). In parallel, through the downgoing communication, the device 100 provides the mobile telephone 155 with a link for the downloading of the application which will be launched during recognitions of the mobile telephone 155 and of the library of programs.

The device which is the subject of the present invention allows, for example, the displaying of personalized offers when entering a shop or electronic payment ("e-payment"), when leaving.

It is observed that the same application can manage several virtual loyalty cards constituting a wallet of loyalty cards.

Figure 3:
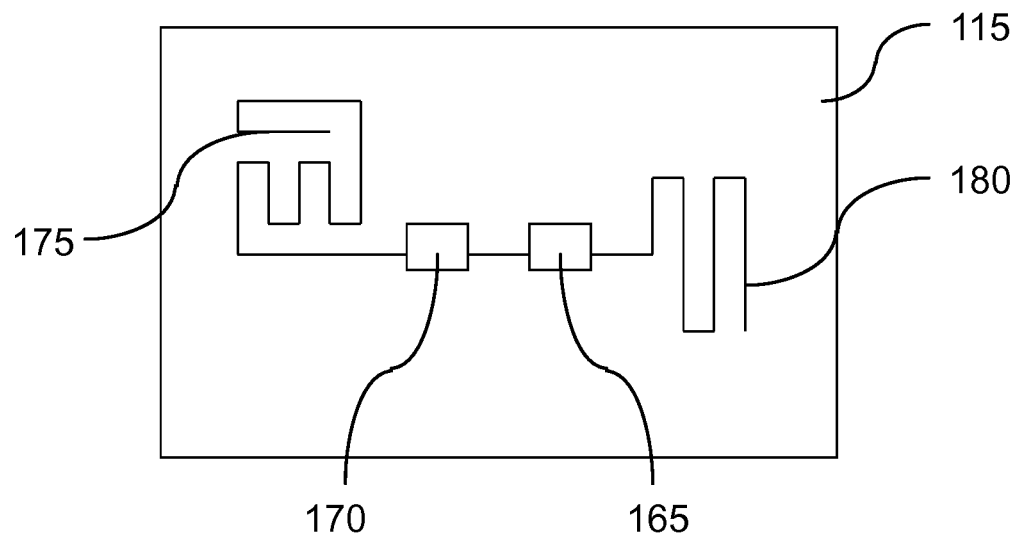
FIG. 3 represents, schematically and viewed from above, electronic components on an electronic card incorporated into the device illustrated in FIGS. 1 and 2.
Figure 4:
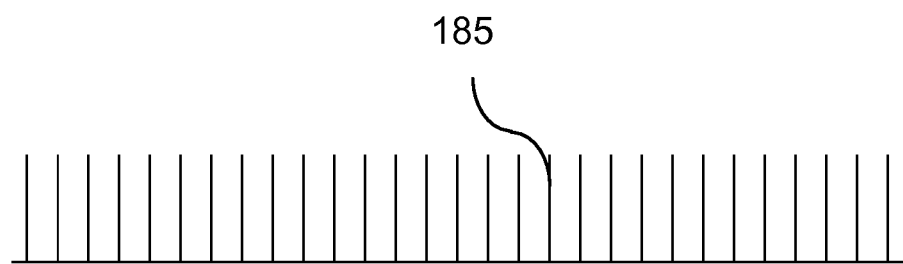
FIG. 4 represents a set of frequencies implemented by the device illustrated in FIGS. 1 to 3.

As regards the dimensions of the antennas 175 and 180 represented in FIG. 3 and separated by two resistors 165 and 170, all the physical characteristics of the track (width, length, thickness, design) are suited to generating a field with, in particular, horizontal polarization, and to do so over a very wide band of from a few hundred MHz to a few GHz.

Successive operating steps of the electronic card 115 and of the mobile telephone 155 are observed in FIG. 5.

In the course of a step 205, the mobile telephone 155 is inserted into the device 100 and the flap 140 is closed, thus isolating the mobile telephone 155 from the real base station with which the mobile telephone 115 is associated. The closing of the electronic lock 145 and 150 is detected by the electronic circuit 115.

In the course of a step 210, the electronic circuit 115 emits a set of spread frequencies representing signals emitted by tens, or indeed hundreds, of mutually adjoining base stations of a mobile telephone network. Preferably, the electronic circuit emits all the base station frequencies of the various operators.

In the course of a step 215, the mobile telephone 155 detects that it has lost its association with the base station with which it was associated outside of the device 100.

In the course of a step 220, the mobile telephone 155 searches for the presence of a first base station frequency (beacon pathway) with which it could associate, for example the frequency used by the external base station with which the mobile telephone was initially associated. Since the electronic circuit 115 emits this frequency, the mobile telephone 155 selects it. In the case where the electronic circuit does not emit all the usable frequencies, because it emits a large number thereof, the obtaining, by the mobile telephone 155 of a virtual base station frequency with which to associate is, in any case, fast.

In the course of a step 225, the mobile telephone 155 dispatches a channel request (for example for channel "1") to the base station by using the frequency (beacon pathway) selected, by proposing a particular channel.

In the course of a step 230, the electronic circuit 115 emits a signal of tuning to the channel request. A point-to-point communication is then instigated between the mobile telephone 155 and the electronic circuit 115. Thus, the electronic circuit 115 allocates to the mobile telephone 155 a channel on which it can exchange messages with the electronic circuit 115.

In the course of a step 235, the mobile telephone 155 emits a message of positioning in the new simulated cell ("location update").

In the course of a step 240, the electronic circuit 115 receives the positioning message, determines the start instant of the packets having a payload and takes samples at the instants at which the message represents the IMEI and then other samples at the instants at which the message represents the IMSI. It is noted that each sample gives a numerical value representative of the amplitude of the "local update" signal, without decoding of this signal. In particular, neither the IMEI, nor the IMSI are decoded. Just their traces in the intensity of the electromagnetic field emitted by the mobile telephone 155 serve to constitute the value of the samples.

In the course of a step 245, a digest ("hash") is obtained on the basis of the value of the samples. For example one of the algorithms SHA1 or SHA2 is used to provide this digest, which serves as digital signature of the mobile telephone 155.

In the course of a step 250, the digest is introduced into a query addressed to a database retaining signatures of mobile telephones. According to case, either the signature is sought identically, or a distance function is used to determine the closest signature in the database (to take account of the noise which may affect the extracting of samples).

As feedback, the database provides an indication of the recognition of the signature and, if the signature is recognized, information intended for the bearer of the mobile telephone 155. In the case where this entails granting a right of access to the bearer of the mobile telephone 155, the feedback is destined for an actuator of the barrier or of the door. In the case of e-payment, the feedback occurs after debiting the account of the bearer of the mobile telephone 155.

Limiting oneself to the case of information intended for the bearer of the mobile telephone 155, in the course of a step 255, the electronic circuit 115 dispatches a message, using the shared channel, in point-to-point, to launch an application on the mobile telephone 155. As set forth above, this message can take the form of a short message. It is noted that, on this point-to-point channel, the telephone number of the mobile telephone 155 is irrelevant. The transmitter of the electronic circuit 115 is frequency-modulated (for example of FSK type, for Frequency Shift Keying).

In the course of a step 260, the electronic circuit 115 stops the emission of an electromagnetic field and causes the opening of the lock 145 and 150.

It is noted that the circuit 115 does not respond to the "location update" location message, according to the mobile telephone protocol, and does not decode it. No communication is thus set up on a mobile telephone network, even virtual.

In the course of a step 265, the mobile telephone 155 is withdrawn from the device 100 and reconnects to a base station of the mobile telephone network of its operator, while profiting from the maintaining of its synchronization with the base station that it quit in the course of step 210.

Matters regarding synchronization between the mobile telephone 155 and the electronic circuit 115 are developed hereinbelow.

High clock stability is required in order for any temporal synchronization to be successful. This high stability may be obtained locally by virtue of very specific, but very expensive components or by slaving a low-cost local oscillator to a supposedly stable external reference such as a GPS signal, DCF 77 (77.5 KHz), Grandes Ondes France Inter (162 KHz) or else a GSM base station.

Thus, a GSM base station provides a clock reference with a stability of 0.05 ppm. More precisely, the clock frequency F is guaranteed to lie between $F-(0.05/10^6)*F$ and $F+(0.05/10^6)*F$.

Thus, the electronic card 115 comprises a sub-system including:
- a temperature-compensated and voltage-controllable low-cost oscillator with a stability of the order of 2 ppm,
- a receiver 865 (see FIG. 14) suitable for acquiring and digitizing the signal of a GSM base station by way of the antenna 130 external to the box 105,
- a signal processing module suitable for calculating the frequency shift between the local oscillator and the reference frequency (67.78833 kHz) included in the GSM base station signal carrier. This module is integrated into the monitoring sub-system 820,
- a digital-analog converter ("DAC") suitable for controlling the local oscillator and
- an automatic slaving means configured to minimize the frequency shift mentioned hereinabove, by fast iteration of measurements of the shift and of adjustments of the local oscillator's control voltage.

This slaving affords a local oscillator, innately specified to 2 ppm, with improved stability of the order of that of the reference frequency, that is to say of the order of 0.05 ppm.

The device 100 is configured to carry out this slaving in a regular manner so as to guarantee this stability of 0.05 ppm.

The device 100 includes an ultra-wide-band radiofrequency emission sub-system, 815 and 860, in the sense defined by the European directive, that is to say "intentionally broadcasting energy on wide band of at least 50 Mhz".

This sub-system is configured to broadcast at low power an ultra-wide-band signal in the band from 868 Mhz to 960 Mhz, under the supervision of the supervision module 820. The sub-system is configured to generate an ultra-wide-band signal such as this so that, through the 400-kHz bandpass filters, the signal perceived resembles a frequency-modulated narrow-band signal, that is to say of the same nature as a GSM base station signal.

More specifically, the perceived signal is that of a GSM base station emulator with parameters customarily used for in-factory tests, in particular the couplet MNC-MCC perceived is equal to 001-01 (used for the test) and the "Location Area Code" arbitrarily fixed at "0".

Thus, the mobile telephone 155 sees through a multitude of bandpass filters as if there were a multitude of base stations around it. Moreover, this sub-system is configured to broadcast an ultra-wide-band signal such as this in such a way that it does not exhibit any shift, in the time domain, with the signal of the GSM base station, with which the clock slaving has been operated.

The electromagnetic spectrum thus generated and thus synchronized in the time domain is equivalent to that of a mobile telephone cell in which all the possible base station frequencies were present. Thus, the mobile telephone 155 exposed to such an electromagnetic field necessarily and very rapidly finds the frequencies of interest to it.

The recognition of the mobile telephone 155 is developed hereinbelow.

The ultra-wide-band electromagnetic signal generated as set forth hereinabove is suitable for forcing the mobile telephone exposed to such a field to initiate a "Location Update" procedure. Throughout the description, it is understood that the ultra-wide-band electromagnetic signal is always strictly limited to the exclusive electromagnetic coupling zone ("Faraday Cage").

In order to be able to launch the "Location update" procedure, the mobile telephone 155 firstly performs a request for a dedicated radiofrequency channel on which the exchanges of messages associated with the "location update" procedure will take place.

The scheme described hereinbelow allows the device 100 and the mobile telephone 155 to dialog on a dedicated radiofrequency channel without the device 100 having had knowledge of the beacon frequency onto which the mobile telephone 155 was previously "locked-on".

This dedicated radiofrequency channel request is performed by the emission of a burst of RACH type on a frequency Fx (Fx being the beacon frequency onto which the mobile telephone was "locked-on"), a priori unknown to the device 100. The RACH burst contains the precise date of the request as well as a reference of the request chosen in a random manner between "0" and "31". Thus at one and the same date, there may be up to 32 discernable requests for dedicated radiofrequency channel.

The monitoring sub-system 820 is suitable for configuring the sub-system 860 by way of the parameter "MS_MAX_TX_PWR_CCH" and of the energy detection threshold, so that the sub-system 860 is configured to detect exclusively the energy transmitted by the mobile telephone 155 during the emission of the RACH burst and to precisely date this detection. Thus any detection of energy in the exclusive electromagnetic coupling zone ("Faraday Cage") is equivalent to a request for dedicated radiofrequency channel.

The monitoring sub-system 820 is suitable for responding favorably and "blindly" to such a request by generating in the ultra-broadband signal a series of at least 32 messages regarding dedicated radiofrequency channel allocation ("Immediate Assignment"), each series of 32 messages being dated with a date close to that of the detection of energy recorded by the sub-system 860.

The set of these "Immediate Assignment" messages allocates to the mobile telephone 155 a unique dedicated radiofrequency channel, on which the sub-system 860 is suitable for receiving.

This set of messages is sufficiently "extensive" (both in its date-stamping and in the request references) for the mobile telephone 155 to find, in this set, a response to its request.

Henceforth, the mobile telephone 155 and the device 100 are configured to dialog via the unique dedicated radiofrequency channel (in the upgoing direction) and via the ultra-wide-band signal (in the downgoing direction).

The monitoring sub-system 820 is suitable for dispatching in the ultra-wide-band signal a message "Identify Request" of IMEI type and the sub-system 860 is suitable for recording the response of the mobile telephone 155 on the previously assigned dedicated radiofrequency channel and for dispatching the response thereof to the monitoring sub-system 820 in the form of a digest of 56 characters (SHA-224).

In variants, the flap 140 carries a screen, for example a touchscreen. The circuit 115 allows an interaction of the user with this screen and with the mobile telephone 155. For example, what is displayed on the screen of the mobile telephone 155 is represented on such a touchscreen.

In variants, the flap 140 is replaced with a tablet which operates a program to interact with the bearer of the mobile telephone 155, for example by presenting commercial offers to him.

In this variant, any telephone becomes, through the communication with the tablet, a tablet having a rich and personalized interface.

Other aspects of the present invention are given in the description of FIGS. 6 to 15 which follows.

Figure 6:
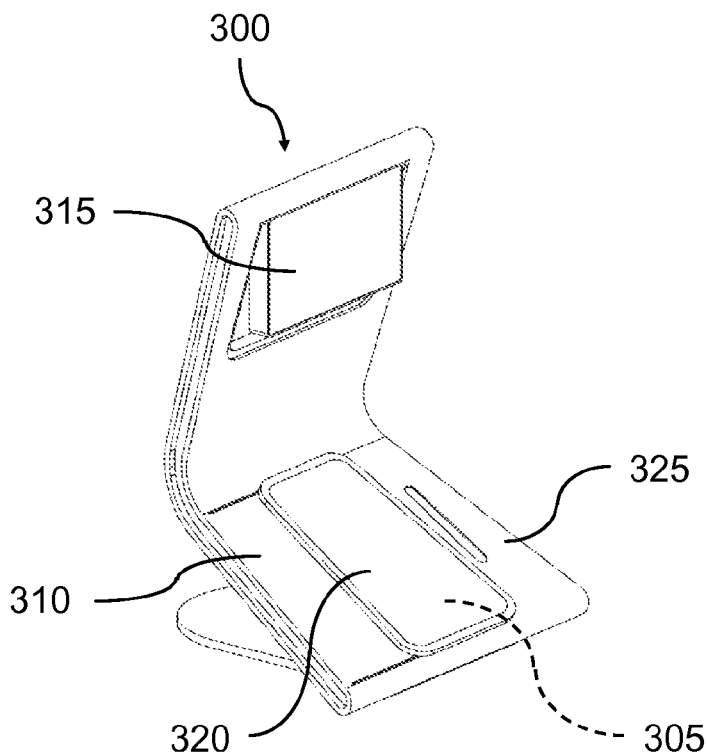
FIGS. 6 to 11 represent, schematically, various particular embodiments of the mechanical part of a device which is the subject of the invention.

FIG. 6 depicts a device 300 comprising a box 325 mounted on a foot, consisting of a support made of conducting material 310 and of a sliding lid made of conducting material 320, making it possible to electromagnetically isolate a communicating mobile terminal 305 from the environment of the device 300. The device 300 defines, inside the box 325, an exclusive electromagnetic coupling zone, also called, in the subsequent description, "exclusive coverage zone" since excluded therefrom are the electromagnetic signals present outside the box 325. It is noted that the sliding lid 320 comprises a window so that the user always sees his mobile terminal 305, during the identification procedure. The device 300 also comprises a screen 365 which embodies a user interface, that is to say the display of operating data and/or of questions and, optionally, the inputting of data by the user.

Figure 7:
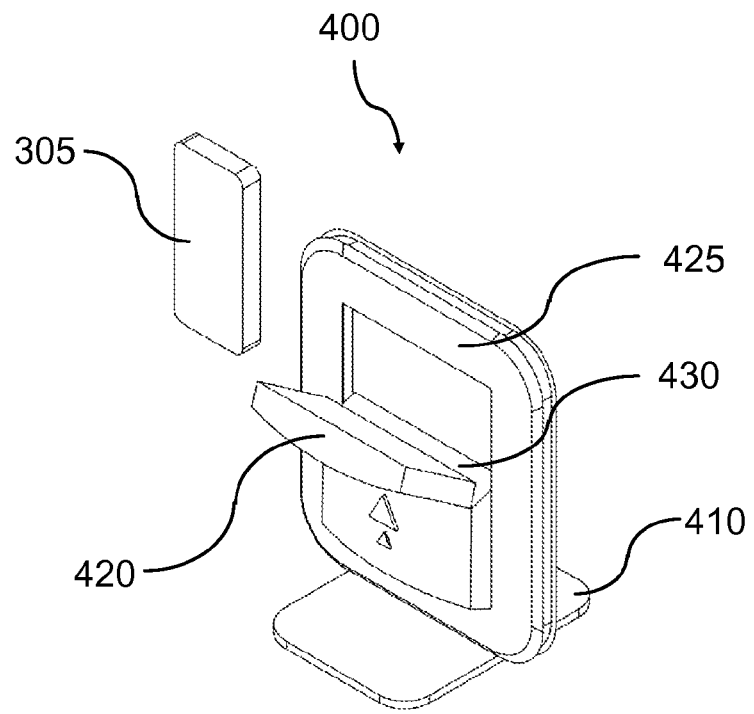

FIG. 7 depicts a device 400, of generally rectangular and vertical form, comprising a box 425 mounted on a foot 410. The box 425 consists of a support made of conducting material 430 and of a fold-down lid made of conducting material 420, making it possible to electromagnetically isolate a communicating mobile terminal 305 from the environment of the device 400. The device 400 thereby defining, inside the box 425, an exclusive electromagnetic coupling zone. It is noted that the fold-down lid 420 comprises a window so that the user always sees his mobile terminal, during the identification procedure. In the embodiment illustrated in FIG. 7, the mobile terminal 305 is slipped into a vertical space made of conducting material, the upper part being closed by the lid made of conducting material 420 thereof.

Figure 8:
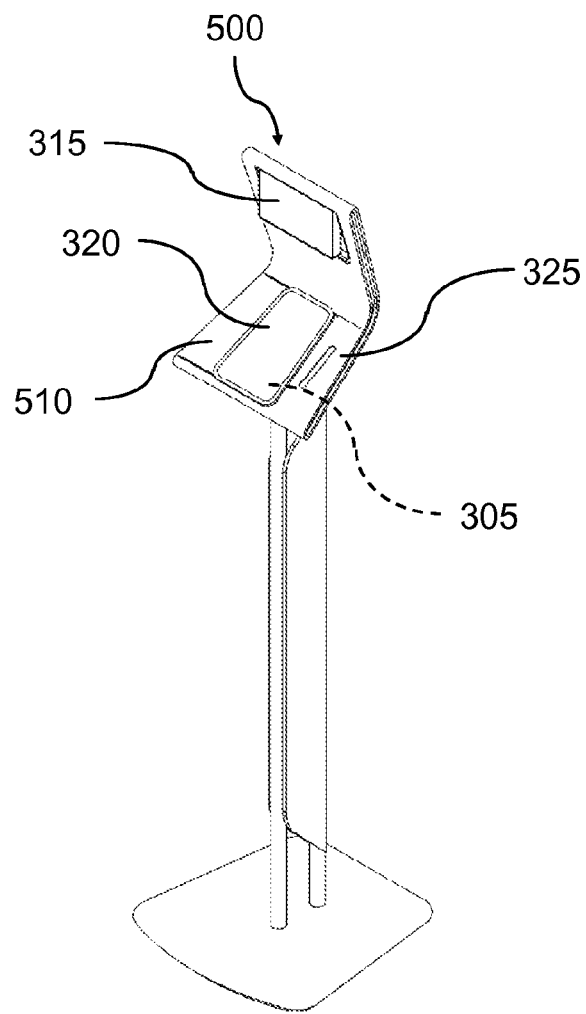

FIG. 8 depicts a device 500 similar to the device 300 with the exception of the foot which is intended to be stood directly on flooring and not on a work surface or a display counter.

Figure 9:
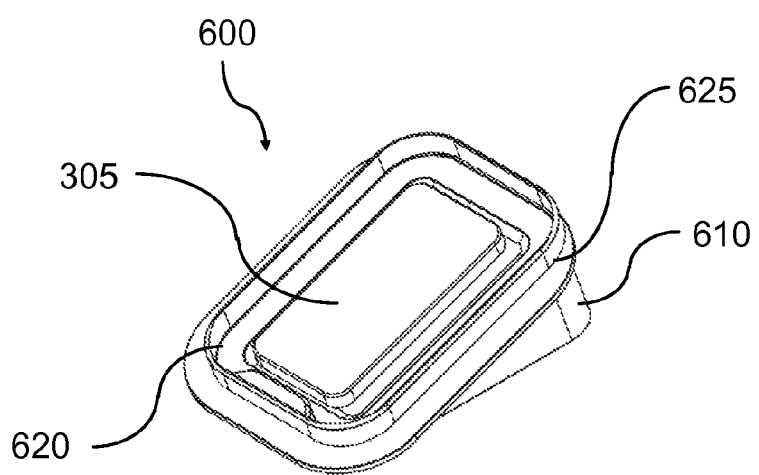

FIG. 9 depicts a device 600 of generally rectangular and oblique form, comprising a box, mounted on a foot 610 and consisting of a support made of conducting material 625 and of a lid opening by way of a conducting material hinge 620, making it possible to electromagnetically isolate a communicating mobile terminal 305 from the environment of the device 600 by defining, inside the box, an exclusive electromagnetic coupling zone.

Figure 10:
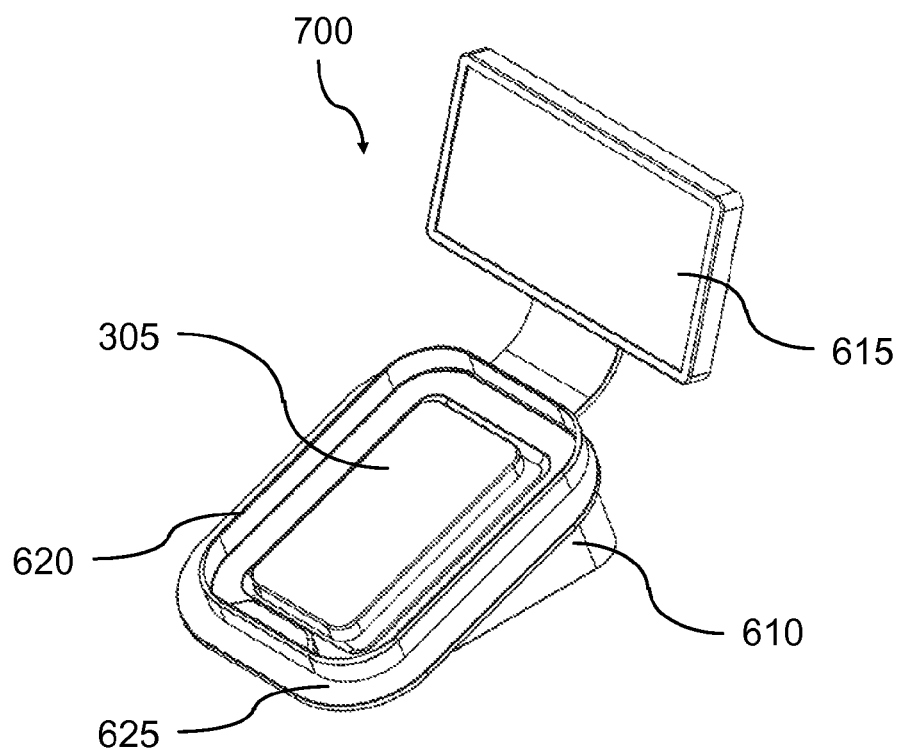
Figure 11:
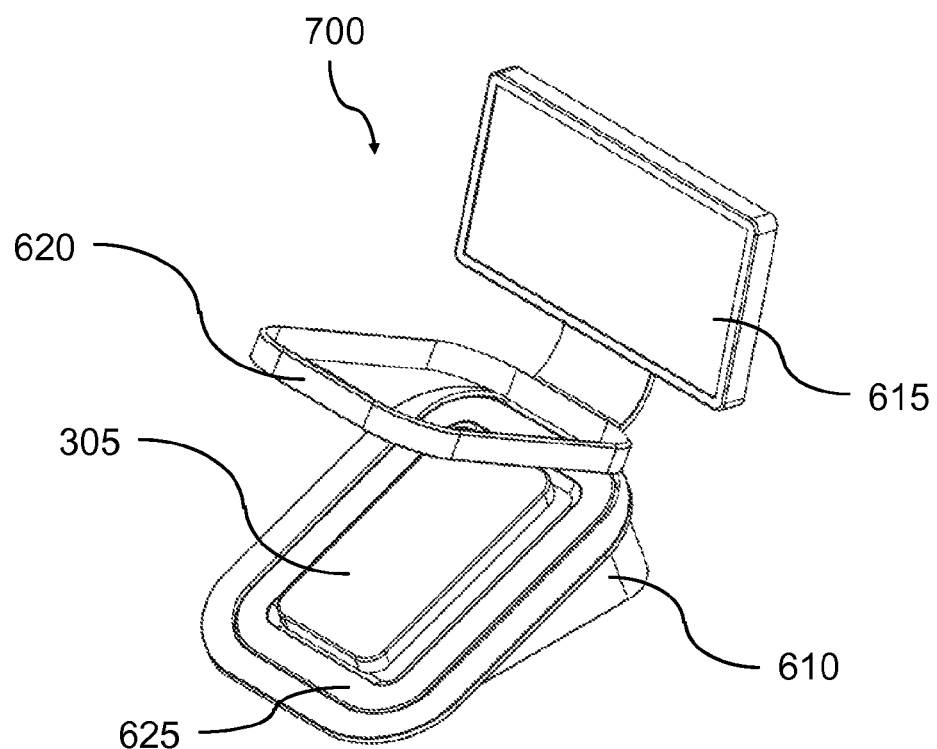

FIGS. 10 and 11 depict a device 700 similar to the device 600, except that it comprises a screen 615 forming a user interface.

In FIG. 10, the device 700 is closed. In FIG. 11, the device 700 is open.

Whatever its form, the device for identifying a communicating mobile terminal comprises, in addition to the electromagnetic coupling means defining an exclusive zone of electromagnetic coupling between the device and the mobile terminal, elements not represented in FIGS. 6 to 11:
an ultra-wide-band (UWB) radio interfacing means and
a means for recognizing a unique digital signature of the mobile terminal implementing a simulation for connecting the mobile terminal to a base station of a cellular telecommunication network.

In the embodiments described hereinbelow, with regard to the figures, the device which is the subject of the invention embodies the UWB radio interface so as to propose a solution for simple, contactless, identification with a measured speed of less than a few seconds for 99% of communicating mobile terminals, and which is compatible with all existing GSM telephones, including 2G/3G UMTS dual-mode telephones, without any hardware modification or installation of software on the telephone, using a unique digital signature of the mobile item of equipment, which signature is independent of the SIM card or of the data contained in the SIM, respecting and thus safeguarding the private data of the bearer of the mobile item of equipment.

Interactivity similar to that rendered possible only with a telephone furnished with NFC communication means is therefore afforded to all existing GSM/UMTS mobiles by this device.

Figure 12:
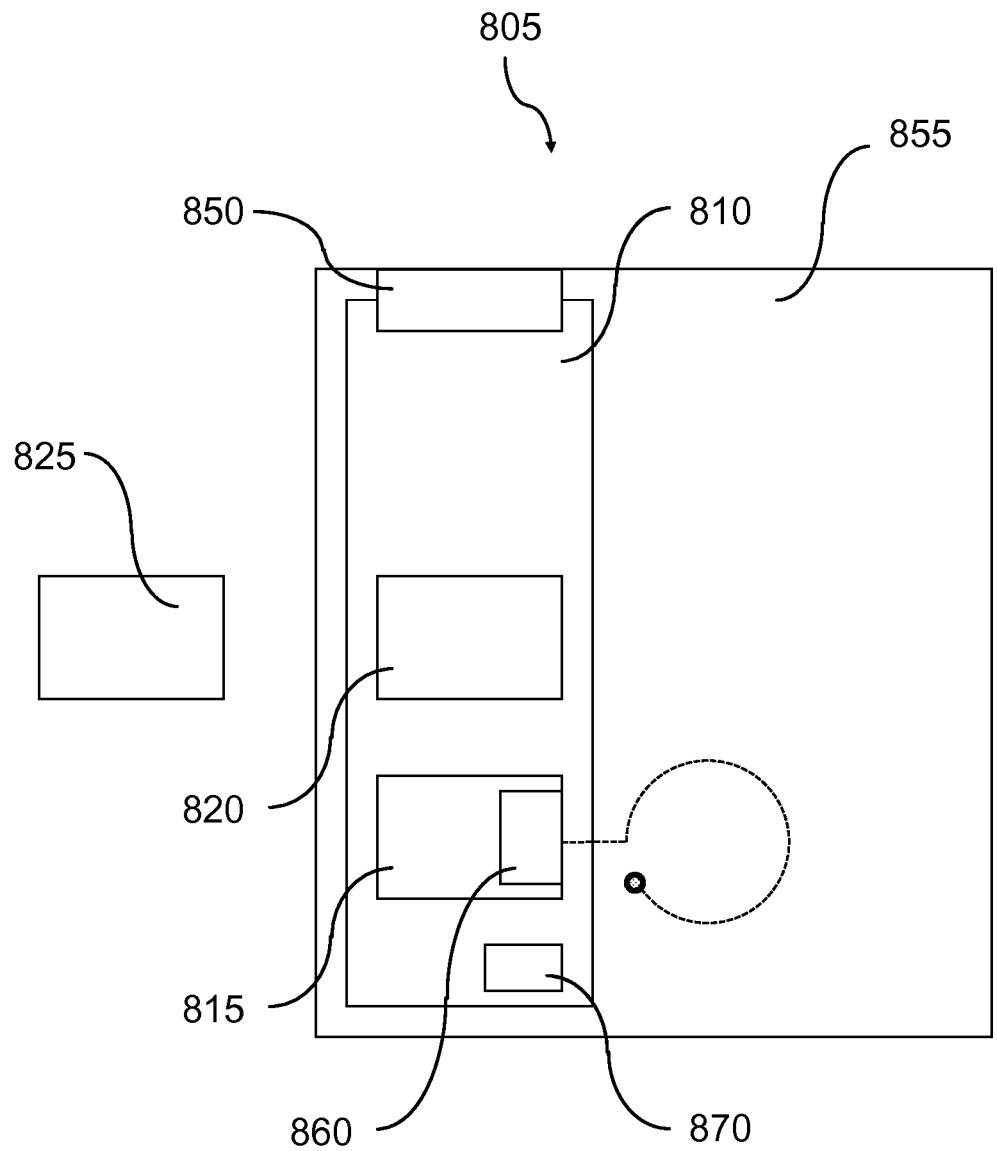
FIGS. 12 to 14 represent, schematically, various block diagrams of particular embodiments of the device which is the subject of the invention.

As illustrated in FIG. 12, in embodiments, the device 805 which is the subject of the invention comprises an electronic circuit 810, which comprises, in the exclusive electromagnetic coupling zone 855:
an emitter/receiver radioelectric circuit 815 operating in a wide band of frequencies, which embodies the UWB radio interfacing means,
a supervision circuit 820, which embodies the electronic signature recognition means.

The supervision circuit 820 is connected to a master system 825, in the case where the device 805 is used as a peripheral, as illustrated in FIG. 12. In the case where the device 805 embodies an autonomous integrated item of equipment providing complementary functionalities, for example, a user interface, a screen, a touchscreen, an electric striker control, a code keypad, a biometric reader, etc. . . . , the device 805 comprises, furthermore, an application circuit 830, as illustrated in FIG. 14.

As illustrated in FIG. 13, the function of the supervision circuit 820 can be shared between a lightweight supervision device 835 and a central server 840, within the framework of a centralized architecture. Subsequently, the term supervision circuit 820 is understood to mean both the case where the function of the supervision circuit is integrated and the case where said function is shared.

The supervision circuit 820 is in charge of all the numerical and logical processing operations of the device and, in particular, the processing operations of the physical layer up to the Radio Resources ("RR") layer and Mobility Management ("MM") layer. The supervision circuit 820 supervises the radioelectric circuit 815 and provides the result of the identification to a master system 825 or to the application circuit 830.

The radioelectric circuit 815 does not comprise any antenna but a polarized electromagnetic coupling sub-circuit 860, the polarization strengthening the exclusive coverage zone. This strengthening signifies that the difference in level of electromagnetic energy, received within the exclusive coverage zone, between the electromagnetic energy "emitted" by the radioelectric circuit 815 situated inside the exclusive coverage zone and the electromagnetic energy arising from sources outside this exclusive coverage zone is increased in an appreciable manner by this coupling sub-circuit 860. This polarization is aligned with the predominant polarization of mobile telephones; "horizontal" polarization. This polarization also plays a positive role in the effectiveness of the electromagnetic coupling and correspondingly increases the above-mentioned difference in electromagnetic energy received.

It is noted that, in the absence of any antenna, it is not possible to speak of radioelectric emission in a formal manner insofar as the electromagnetic wave does not have the formal possibility of being formed. On the other hand, there may be a communication by electromagnetic coupling within this exclusive coverage zone 855.

In the exclusive zone of coverage of the radioelectric circuit 815, the power of the signal "emitted" by the radioelectric circuit 815 is, by definition and by construction, always greater than the power of the signals emitted from outside the exclusive coverage zone.

The radioelectric circuit 815 generates an ultra-wide signal in the 900 Mhz band, in accordance with the definition fixed by the decision of the ARCEP 2007-683 and by European directive 2009/343/CE.

The radioelectric circuit 815 generates this ultra-wide signal so that outside the box of the device 805, the power mask fixed by the decision of the ARCEP 2007-683, modified by Annex 7, and aligned with European directive 2009/343/CE is always complied with.

This ultra-wide signal is constructed so that inside the exclusive coverage zone, it can be seen through various appropriate bandpass filters as a multitude of frequency-modulated (FSK) signals, and which can therefore be received and demodulated by a mobile complying with the GSM standard and situated inside the exclusive coverage zone and solely inside the latter.

More specifically, this ultra-wide signal is constructed in such a way that inside the exclusive coverage zone, it can be seen through various appropriate bandpass filters as a multitude of, predominantly identical, GSM beacon channels. By convention, in the remainder of the document, reference is made to these GSM beacon channels by the term 'beacon pathway C0'.

In certain embodiments, as illustrated in FIG. 14, the radioelectric circuit 815 integrates a radioelectric receiver sub-circuit 865 capable of analyzing the electromagnetic environment outside the exclusive coverage zone by virtue of an antenna 845 situated outside the electromagnetic shielding.

This knowledge of the electromagnetic environment outside the exclusive coverage zone serves to construct the ultra-wide signal in such a way as to minimize any interference with the electromagnetic environment outside the exclusive coverage zone.

The electronic circuit 810 also comprises a standard contactless reading circuit 870 according to the RFID standard ISO14443 so as to be able to read standard RFID/NFC tags.

The electronic circuit 810 comprises an electromechanical circuit 850, the function of which is to:

a) Invite the user to deposit or insert his mobile telephone into the device 805 so as to be able to be identified rapidly and benefit from a service, step 904, b) Accommodate the mobile telephone of the user, step 906, c) Detect the presence of the telephone in the device 805, step 908, d) Temporarily and electromagnetically isolate the mobile telephone by "enclosing" the entirety of the telephone, step 912, e) Inform the user of the progress of the identification process, f) Inform the user of the success or of the failure of the identification, step 940, g) Release, if necessary, the mobile telephone of the user, step 944 and h) Inform the user of the possibility of retrieving his mobile telephone, step 946.

As illustrated in FIGS. 6 to 11, embodiments comprise, as mechanical means, a box made of conducting material with a manually opened/closed hermetic lid or cover made of conducting material. This box has a sufficient volume to allow the user to deposit his mobile telephone in the box, step 906, and to retrieve it with ease, step 948. The user is in charge of closing and opening the cover.

An embodiment (not represented) consists of a slightly inclined vertical support made of conducting material capable of accommodating a portable telephone in a vertical position. This support is isolated by a vertical half-cylinder made of conducting material rotating about the central axis of the support. The rotation of the half-cylinder is controlled by electronics and can be based on motion sensors and/or weight sensors and/or presence sensors. For example, the box of the device comprises a support suitable for accommodating a mobile terminal, in a protection surrounding at least 440 degrees of angle around the portable telephone and open on at least three orthogonal sides of the mobile terminal.

The supervision circuit 820 implements in particular a partial emulation of a GSM base station, mixed with a technology pertaining to ultra-wide band (UWB), in the course of steps 916 to 942.

The supervision circuit 820, for this base station emulation part, has several modes of operation, including a standby mode and an active mode.

The supervision circuit 820 enters standby mode, step 950 a) when starting the device 805, b) at the end of the active mode or c) on an item of information arising from the electromechanical circuit 850, for example the detection of an opening or of a detection of absence of telephone in the box, step 948.

The supervision circuit 820 exits the standby mode to enter active mode, step 910, on an item of information arising from the electromechanical circuit 850, for example telephone presence detection, step 908, and optionally detection of the closing of the lid of the box.

In standby mode, the electromechanical circuit 850 does not offer total electromagnetic isolation. In standby mode, the supervision circuit 820 disables any "emission" of the radioelectric circuit 815, step 952.

In standby mode, the supervision circuit 820 has the possibility of instructing the radioelectric circuit 815 to perform in a periodic manner, step 902, an identification of the GSM beacon-pathways situated outside the exclusive coverage zone by virtue of the antenna 845 situated outside the electromagnetic shielding. The supervision circuit 820 thus has a knowledge of the electromagnetic environment outside the device 805.

In standby mode, the supervision circuit 820 controls the visual and or auditory notification sub-circuits situated in the electromechanical circuit 850 so as to advise of the availability of the device 805 to accommodate a mobile telephone or an RFID/NFC tag, step 904. In standby mode, the supervision circuit 820 notifies the application circuit 830, in the case of the device 805 operating in the guise of autonomous integrated item of equipment, of the availability of the device 805 to accommodate a mobile telephone or an RFID/NFC tag.

In active mode, before carrying out a broadcasting of signals, the supervision circuit 820 adjusts the level of electromagnetic energy of emission, step 914, taking account of the effect of electromagnetic isolation of the electromechanical circuit 850, so as to minimize the level of energy emitted outside of the exclusive coverage zone and so as to comply with the regulations in force.

In active mode, the supervision circuit 820 instructs the broadcasting, of an ultra-wide signal generated by the radioelectric circuit 815, step 916. This ultra-wide signal can be seen through various appropriate bandpass filters as a multitude of GSM beacon channels, commonly called C0, containing a combination set of logical channels:
  a) A combination V: C0T0-V,
  b) Optionally three combinations VI: C0T2-VI, C0T4-VI and C0T6-VI and
  c) Optionally four combinations VII: C0T1-VII, C0T3-VII, C0T5-VII and C0T7-VII.

It is noted that in the expression "CxTy-z", x designates the number of the physical channel ARFCN (Absolute Radio Frequency Channel Number), y designates the time interval (timeslot), and z the combination of logical channels which is defined by the GSM standard.

Alternatively, in the course of step 916, these physical channels contain a combination set of logical channels:
  a) A combination IV: C0T0-IV and
  b) From one (minimum) to seven combinations VII: C0T1-VII, C0T2-VII, C0T3-VII, C0T4-VII, C0T5-VII, C0T6-VII and C0T7-VII.

As a reminder, the definition of the combinations is as follows:
  a) Combination IV: FCCH+SCH+BCCH+CCCH,
  b) Combination V: FCCH+SCH+BCCH+CCCH+4 SDCCH+2 SACCH; [(5×1)+(5×1)+(1×4)+(3×4)+(4×4)+(2×4)+1 idle=51–frame multiframe]. Can only be in C0T0,
  c) Combination VI: BCCH+CCCH. Can be used in C0T2, C0T4 or C0T6 and
  d) Combination VII: 8 SDCCH+4 SACCH.[(8×4)+(4×4)+3 idle=51–frame multiframe]. Can be used everywhere except in C0T0.

Preferably, in the course of step 916, the radioelectric circuit 815 also broadcasts, in the exclusive coverage zone, a random ultra-wide-band signal at very low power around 2100 Mhz so as to have a very low ratio Ec/No in the exclusive coverage zone and to thus favor the transition of a UMTS dual-mode mobile situated in the exclusive coverage zone to the GSM protocol.

As indicated previously, the ultra-wide signal generated by the radioelectric circuit 815, in the course of step 916, can be seen through various appropriate bandpass filters as a multitude of GSM beacon-channels. This multitude of beacon-pathways allows the telephone to detect rapidly, in the course of a step 918, a beacon-pathway in the exclusive coverage zone, and to do so, almost regardless of the beacon-pathway search algorithm specific to each telephone. Indeed, as specified by the GSM standard, the mobile terminal constantly monitors the beacon-pathways present in its environment, by searching for an FCH "burst" on the physical channels according to a sequence specific to each mobile. On account of the extreme density of the beacon-pathways present in the exclusive coverage zone, the mobile terminal immediately detects a beacon-pathway Cx.

The BCCH logical channel uses an MCC-MNC code equal to 001-01, defined customarily for testing and therefore accepted by all mobiles. This MCC-MNC code is necessarily different and has no roaming agreement with the MCC-MNC code used previously by the mobile terminal before its entry into the exclusive coverage zone.

The BCCH logical channel uses a value LAC arbitrarily defined at 0.

The BCCH logical channel uses a value CELL_BAR_ACCESS equal to 0 and a value CELL_BAR_QUALIFY equal to 0. This ascribes a "normal" priority on the "cell".

The BCCH logical channel uses a value MS-TXPWR-MAX-CCH equal to the specified maximum.

The CCCH channels are all used in the guise of AGCH in broadcasting mode.

The effect of these values MCC/MNC/LAC/ CELL_BAR_ACCESS/CELL_BAR_QUALIFY is to immediately force the mobile terminal situated in the exclusive coverage zone to initiate a "Location Update Request" procedure, in the course of a step 920. The mobile terminal decodes the information SCH (and in particular the time base FN) and then BCCH contained in the beacon-pathway Cx. The mobile terminal decodes an MCC-MNC code equal to 001-01. A consequence of this MCC-MNC test code, accepted by all mobiles, is that the mobile terminal immediately initiates a "Location Update Request" procedure. Accordingly, the mobile terminal firstly performs, in the course of step 922, a request for a dedicated supervision channel SDCCH on which it will thereafter perform the "Location Update" query, in the course of step 928). This SDCCH channel request is performed by dispatching a burst of RACH type on the physical channel Cx.

Thus the mobile terminal emits, in the course of a step 922, an RACH burst with a Reference Request composed of a random number RA between 0 and 31 and of the frame number FN=z, instant at which the RACH burst is dispatched.

The mobile terminal therefore dispatches at an instant FN=z an RACH burst with a value RA=y random and an RR=z. $0 \leq y < 32$ since the request is prompted by a "Location Update Request"; FN=Frame Number, RR=Reference Request, RA=Random.

Once the RACH has been dispatched, the mobile terminal starts listening on the AGCH logical channels on the physical channel Cx in search of a response with (RA=y, RR=z) corresponding to its request.

It is noted that, in actual fact, this RACH burst dispatched by the mobile terminal is totally ignored by the device 805 since the device 805 listens only on the channel C0.

The radioelectric circuit 815 integrates a detector subcircuit (not represented) for detecting a signal in the emission band of the mobile, with a detection threshold of less than the value MS-TXPWR-MAX-CCH of the emission level for an RACH burst broadcast on the BCCH channel. Thus the circuit is capable of detecting and of dating precisely with a number of FN=z' the dispatching of the RACH bursts by the mobile terminal in the exclusive coverage zone, in the course of a step 924.

Thus the device 805 can detect the emission of the RACH burst and date its emission FN=z' with a sufficient temporal precision (so that z'=z or z'=z+1).

As soon as the RACH burst is detected, the radioelectric system 815 emits, in the course of a step 926, on the set of AGCH channels, a series of 64 "Immediate Assignment" messages whose aim is to assign an SDCCH channel on the physical channel C0. These 64 messages cover the whole set of values of the couplet (RA,RR) with RA varying from 0 to 31 and with RR=z'−1 and RR=z'. The precision of the detection and therefore the precision of z' makes it possible to ensure that z=z' or z=z'−1.

One of these 64 "Immediate Assignment" messages therefore has a couplet (RA,RR) corresponding to the RACH request dispatched by the mobile terminal. The mobile terminal therefore takes this message as formal response to its SDCCH channel RACH request (the Immediate Assignment message with RA=y and RR=z).

As soon as this Immediate Assignment message is received, the mobile terminal places itself on the channel C0 on the SDDCH channel which was assigned to it in the Immediate Assignment message specified, in the course of a step 928, and thereupon emits a Location Update Request message on the SDCCH logical channel which has been assigned to it.

It is noted that step 920 notes the start of the Location Update request procedure. This procedure is materialized in part in the course of step 928 with the dispatching of the "Location Update Request" message by the mobile terminal.

In parallel, in the course of step 928, the supervision circuit 820 is configured to request in return on the same SDCCH channel an "Identity Request" message of IMEI type.

The mobile terminal responds on this same SDCCH channel with an "Identity Response" message with the IMEI value of the mobile, in the course of a step 930.

In the course of a step 932, the supervision circuit 820 is adapted to encrypt the IMEI value received according to an encryption scheme of SHA1 type and to dispatch the mobile's unique digital signature thus obtained to the application circuit 830 or to the master system 825.

It is noted that the fact that the recognition means is suitable for recognizing a unique digital signature of the mobile terminal, which signature is independent of the subscriber identification card or of the data contained in said card, is not contradictory with a recognition of a unique digital signature of the mobile terminal implementing a simulation of connection of the mobile terminal to a base station of a cellular telecommunication network.

Indeed, the IMEI is an identifier number solely of the communicating mobile terminal. This number is coded and stored in the mobile terminal and not in the SIM card. This number is not, in the true sense, confidential. For example, it can be read on any telephone by typing the keypad sequence '*#06#' (star, hash, zero, six, hash).

The SIM card contains, for its part, other information directly related to the subscription, by the bearer of the SIM card, for example to cellular communications services. This strictly confidential information is for example the IMSI (the unique international mobile subscriber identifier, or International Mobile Subscriber Identity), or else specific encryption keys Ki and Kc owned by the cellular communications services provider.

In the course of a step 934, the device or the associated server performs the identification of the mobile telephone and searches for the data relating to the user of this mobile telephone for example a number of loyalty card points, promotions to be communicated to him, etc.

The supervision circuit 820 dispatches a "Location Update Accept" message on the same SDCCH channel in the course of a step 936.

The master system 825, or the application circuit 830, has the possibility at this moment of the identification procedure of instructing the supervision circuit 820 to dispatch a personalized minimessage (SMS) on the same SDCCH channel to the mobile, in the course of a step 938.

The master system 825, or the application circuit 830, in the course of a step 938, is suitable for dispatching a special minimessage (SMS) on this same SDCCH channel to the mobile situated in the exclusive coverage zone, of such a nature as to start, or launch, on said mobile a software application, previously installed on said mobile, without using the telephone number of the communicating mobile terminal.

According to particular characteristics, this software application is suitable for being started automatically on receipt of said special minimessage (SMS).

The supervision circuit 820 dispatches a "Channel release" message, in the course of a step 942, so as to release the channel and the radio resource.

The device 805 then quits the active mode and enters standby mode in the course of step 950.

As is understood in the above description, the device makes it possible with great certainty to trigger and to finish the "camp" process (or registration in the network) and to obtain the IMEI identification of the telephone in a minimum time of a few seconds, and to do so, with any telephone, from any operator Moreover, this device also allows product suppliers or service providers to broadcast to bearers of a mobile during identification by dispatching personalized SMSs directly to their mobile, doing so without having to know their mobile number. For example, during identification of the customer at a cash till or on entry to the shop (and solely during this identification phase), the trader can dispatch, by SMS to the customer, his balance of loyalty points, personalized discount coupons, etc. This broadcasting of SMSs during the identification phase does not require the consumer to disclose their mobile number to the trader, thus safeguarding a personal item of data that is becoming ever more sensitive.

Moreover, this device also allows product suppliers or service providers, during identification and solely during this identification of the mobile in the device 805 which is the subject of the invention, to automatically start their software application previously installed on customers' mobiles, doing so without having to know their mobile number.

The device 805 exits the active mode to enter standby mode when the supervision circuit 820 has dispatched a "Channel Release" message on the SDCCH channel assigned on the physical channel C0.

In addition to the identification of the mobile terminal and therefore of its user, the device which is the subject of the invention allows product suppliers or service providers to broadcast to bearers of a mobile, during the procedure of identification in the device 805, personalized SMSs directly to their mobile, doing so without having to know their mobile number. For example, during identification of the customer at a cash till or on entry to the shop (and solely during this phase of identification in the device 805), the trader can dispatch by SMS to the customer his balance of loyalty points, personalized discount coupons, etc. This broadcasting of SMSs during the identification phase does not require the consumer to communicate their mobile number to the trader, thus safeguarding a personal item of data that is becoming ever more sensitive. The customer can thus benefit from personalized and relevant commercial information during their identification (necessarily intentional since they must insert their mobile into the device 805) without having to communicate sensitive personal data like their mobile number.

Figure 16:
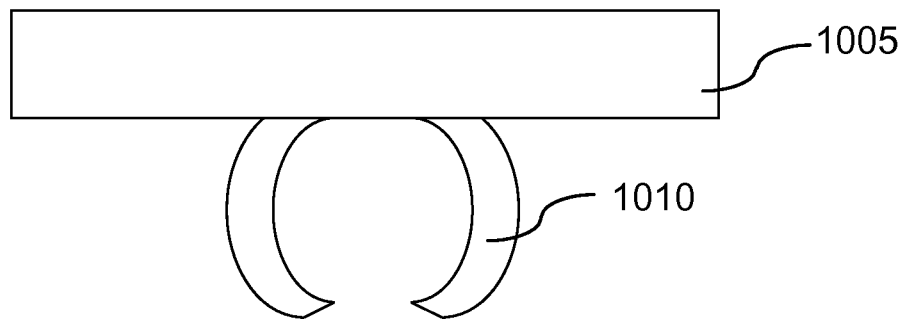
FIGS. 16 to 18 represent, schematically in a side view, three particular embodiments of the device which is the subject of the present invention.

FIG. 16 depicts a device which is the subject of the present invention, which comprises a box 1005, such as presented previously and a means 1010 for fastening to a supermarket trolley. This embodiment has the advantage of allowing the user to keep their eyes permanently on the content of their loyalty card, without having to hold the device in their hand.

Preferably, in this embodiment, there is provision for geolocation, for example by triangulation carried out by the box 1005, on the basis of the positions of base stations of a mobile telephone network. For this purpose, the box 1005 implements the precise time base described hereinabove and the external antenna 130, which dialogs in a continuous manner with beacon-facilities. These beacon-facilities are preferably adapted in the ISM frequency band. For example, the beacon-facilities will be based on a simplified version of the circuit 115. Location in a shop to within two meters is thus possible, thereby allowing the display of promotions immediately accessible by the user within hand's reach.

Figure 17:
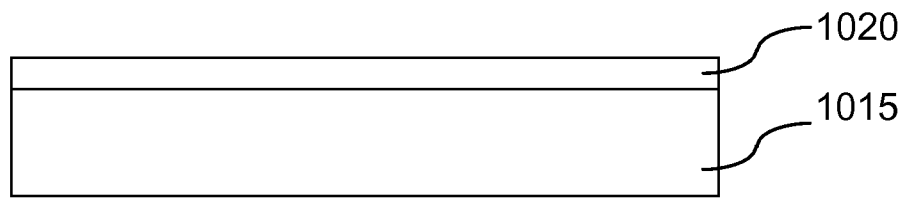

FIG. 17 depicts a device which is the subject of the present invention which comprises a box 1015 furnished with a lid 1020 consisting of a computer tablet. Preferably, this tablet is hardened. This embodiment has the advantage of providing the user with a rich user interface. For example, the tablet 1020 is connected to a computer system of the supermarket by a wireless local network, for example using a WiFi communication. The mobile terminal is then used for self-identification at the level of the tablet 1020.

Figure 18:
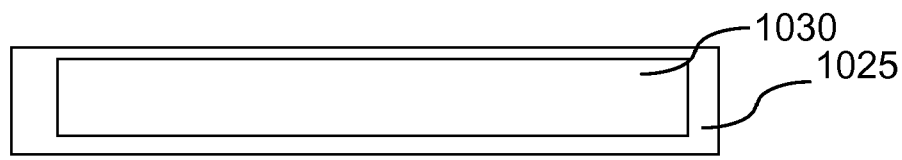

FIG. 18 depicts a device which is the subject of the present invention which comprises a box 1025 associated with a barcode reader 1030. This embodiment has the advantage of allowing the user to identify a product by reading its barcode and to immediately obtain rich information relating to this product.

It is noted that, in other embodiments, not represented, the lid for access to the inside of the box is frontal.

The invention claimed is:

1. Apparatus for identifying a communicating mobile terminal, comprising:
    an electromagnetic coupling device defining an exclusive zone of electromagnetic coupling between the apparatus and the communicating mobile terminal;
    an ultra-wide-band radio subsystem for simulating an availability to communicate with the mobile terminal of at least one base station of a telecommunication network; and
    a monitoring subsystem for recognizing a unique digital signature of the communicating mobile terminal implementing samples of an electromagnetic trace of a message dispatched by the communicating mobile terminal in attempt to connect to a simulated base station.

2. The apparatus as claimed in claim 1, wherein the monitoring subsystem is configured to recognize the unique digital signature of the communicating mobile terminal which is independent of a subscriber identification card or data contained in the subscriber identification card.

3. The apparatus as claimed in claim 1, wherein the electromagnetic coupling device comprises a box for attenuating electromagnetic radiations, the ultra-wide-band radio subsystem communicating with the communicating mobile terminal situated in the box.

4. The device as claimed in claim 1, further comprising a transmitter for transmitting minimessages to the communicating mobile terminal without using the telephone number of the communicating mobile terminal.

5. The device as claimed in claim 1, wherein the monitoring subsystem is configured to launch a software application previously installed on the communicating mobile terminal without using the telephone number of the communicating mobile terminal.

6. The device as claimed in claim 1, wherein the ultra-wide-band radio subsystem is configured to emit an ultra-wide signal which can be seen through various bandpass filters as a multitude of, predominantly identical, GSM beacon channels.

7. The device as claimed in claim 1, further comprising an external antenna; and
    wherein the ultra-wide-band radio subsystem is configured to emit an ultra-wide signal in accordance with signals received by the external antenna to minimize an interference with an electromagnetic environment outside the device.

8. The device as claimed in claim 7, further comprising a receiver for identifying GSM beacon-pathways situated outside the device implementing a signal received by the antenna.

9. The device as claimed in claim 1, further comprising a transmitter for broadcasting a random ultra-wide-band signal around 2100 Mhz, in the exclusive zone.

10. The device as claimed in claim 1, wherein a largest dimension of the exclusive zone is less than half a wavelength of electromagnetic signals implemented by the ultra-wide-band radio subsystem.

11. The device as claimed in claim 1, further comprising:
    a receiver for receiving a reference clock signal from a cellular telephone network; and
    a transmitter for emitting an electromagnetic signal inside the exclusive zone, the signal being synchronized with the reference clock signal.

12. The device as claimed in claim 1, wherein ultra-wide-band radio subsystem is configured to simultaneously emit signals having carriers simulating a plurality of base stations.

13. The device as claimed in claim 1, further comprising:
    a radio-electric subsystem for allocating a communication channel to the mobile terminal;
    a receiver for receiving, on the allocated channel, a signal or message representative of a positioning update request in respect of the mobile terminal, the request being representative of at least one identifier of the mobile terminal; and
    a supervision subsystem for extracting samples of the positioning update request signal to define a signature of the mobile terminal.

14. The device as claimed in claim 13, further comprising a transmitter for emitting a message on the communication channel to cause an item of information to be stored in the mobile terminal.

15. The device as claimed in claim 14, wherein the item of information stored in the mobile terminal depends on the identifier of the mobile terminal.

16. The device as claimed in claim 14, wherein the message emitted by the transmitter on the communication channel comprises an instruction to launch an application previously loaded on the mobile terminal.

17. The device as claimed in claim 14, wherein the transmitter for emitting the message on the communication channel is configured transmit a short message.

18. The device as claimed in claim 13, wherein the supervision subsystem is configured to extract samples representative of the positioning update request at predetermined instants at which the positioning update request represents an identifier of the mobile terminal.

19. The device as claimed in claim 1, which comprises:
   a radio-electric subsystem for allocating a communication channel to the mobile terminal; and
   a transmitter for emitting a message on the communication channel without decoding any positioning update message emitted by the mobile terminal.

20. A method for identifying a communicating mobile terminal, comprising the steps of:

electromagnetic coupling between an identifying apparatus and the communicating mobile terminal in an exclusive zone of electromagnetic coupling defined an electromagnetic coupling device of the identifying apparatus;

simulating an availability to communicate with the communicating mobile terminal of at least one base station of a telecommunication network by an ultra-wide-band subsystem of the identifying apparatus; and recognizing, by a monitoring subsystem of the identifying apparatus, a unique digital signature of the communicating mobile terminal implementing samples of an electromagnetic trace of a message dispatched by the communicating mobile terminal in attempt to connect to a simulated base station.

* * * * *